United States Patent

Sellmyer et al.

[11] Patent Number: 6,139,907
[45] Date of Patent: Oct. 31, 2000

[54] HIGH COERCIVITY LONGITUDINAL RECORDING MEDIA AND METHOD FOR ITS PREPARATION

[75] Inventors: David J. Sellmyer; Chun-Ping Luo, both of Lincoln, Nebr.

[73] Assignee: Board of Regents, University of Nebraska-Lincoln, Lincoln, Nebr.

[21] Appl. No.: 09/078,951

[22] Filed: May 14, 1998

Related U.S. Application Data

[62] Division of application No. 08/558,272, Nov. 13, 1995, Pat. No. 5,824,409.
[51] Int. Cl.[7] ........................................ G11B 5/66
[52] U.S. Cl. ..................... 427/128; 427/129; 427/130; 204/197.2; 428/336; 428/694 TM; 428/900
[58] Field of Search ........................ 428/694 TM, 336, 428/900; 427/128–130; 204/192.2

[56] References Cited

U.S. PATENT DOCUMENTS

| | | | |
|---|---|---|---|
| 4,587,176 | 5/1986 | Corcie | 428/611 |
| 5,051,288 | 9/1991 | Amert . | |
| 5,565,266 | 10/1996 | Hatwar | 428/332 |
| 5,604,030 | 2/1997 | Yamoue | 428/332 |

*Primary Examiner*—Leszek Kiliman
*Attorney, Agent, or Firm*—Suiter & Associates PC

[57] ABSTRACT

A high coercivity longitudinal recording media comprising FePt or similar thin films that are vacuum deposited by RF and DC sputtering. The as-deposited multilayered films are subjected to vacuum annealing. Due to the formation of the ordered phases of FePt or the like, which have very high crystal anisotropy, the annealed FePt films have large coercivity and fine grain size, suitable for use as ultra-high density magnetic recording media.

32 Claims, 5 Drawing Sheets

HIGH COERCIVITY LONGITUDINAL RECORDING MEDIA AND METHOD FOR ITS PREPARATION

SPECIFICATION

CROSS REFERENCES

The present application is a divisional of U.S. application Ser. No. 08/558,272 filed Nov. 13, 1995, now U.S. Pat. No. 5,824,409, issued Oct. 20, 1998.

TECHNICAL FIELD

The present invention relates generally to magnetic recording media and specifically to high coercivity longitudinal recording media suitable for ultra-high density magnetic recording.

BACKGROUND OF THE INVENTION

Present high performance magnetic recording media typically have area densities of 130 to 150 Mb/in$^2$ and coercivities ($H_c$) of 1400 to 1600 Oe. Average grain sizes of these recording media, which are often Co-based, vary from 20–45 nm with larger grain size associated with higher coercivity.

Recent developments in the art have produced magnetic recording media with areal densities of 1 to 2 Gb/in$^2$. For example, media consisting of CoPtCr have been demonstrated with areal densities of between 0.96 and 1.18 Gb/in$^2$. A 2 Gb/in$^2$ media consisting of two layers of differing alloy constitutions has also been developed. The bottom magnetic layer of this media is CoCrPtSi, a low noise, low coercivity film, whereas the top layer is CoCrPt, a high coercivity, high noise film. When combined, the layers produce a recording media with low noise and high coercivity. These 1 to 2 Gb/in$^2$ media typically have coercivities of 1600 to 2120 Oe and average grain sizes of approximately 15 to 20 nm.

Because of the demand to store increasing amounts of information in a practical disk drive, the development of an ultra-high density magnetic recording media with an areal density in the range of 10 Gb/in$^2$ is desirable. However, continued evolutionary improvements in present media technologies will probably not be adequate to support the development of such ultra-high density media. Present media technologies cannot simultaneously provide the increasingly higher coercivities, thinner films, smaller grains and lower media noise necessary. Thus, for ultra-high density recording media to become a feasible technology, new materials must be developed that have coercivities in excess of 3000 Oe with extremely fine grain sizes.

Therefore, it is an object of the present invention to provide an ultra-high density magnetic recording media with an areal density in the range of 10 Gb/in$^2$, high coercivity ($H_c$>3000 Oe), and extremely fine grain size.

SUMMARY OF THE INVENTION

The present invention provides a high coercivity longitudinal recording media with areal densities in the range of 10 Gb/in$^2$ and a method for its production. The media is suitable for ultra-high density magnetic recording. Multilayered thin films, consisting of Iron (Fe) and/or Cobalt (Co) combined with Platinum (Pt) may be vacuum deposited by RF- and DC-sputtering. The as-deposited multilayered films are then subjected to vacuum annealing. Due to the formation of the ordered phases of FePt, CoPt, or the like, which have very high crystal anisotropy, the annealed films have large coercivity and fine grain size, suitable for ultra-high density magnetic recording. The films have easy magneto crystalline axes in the film plane, which is required for longitudinal recording, and coercivity values up to 6,350 Oe.

These and other features, aspects, and advantages of the present invention will become better understood with regard to the following description, appended claims, and accompanying drawings.

DETAILED DESCRIPTION OF THE INVENTION

Figure 1:
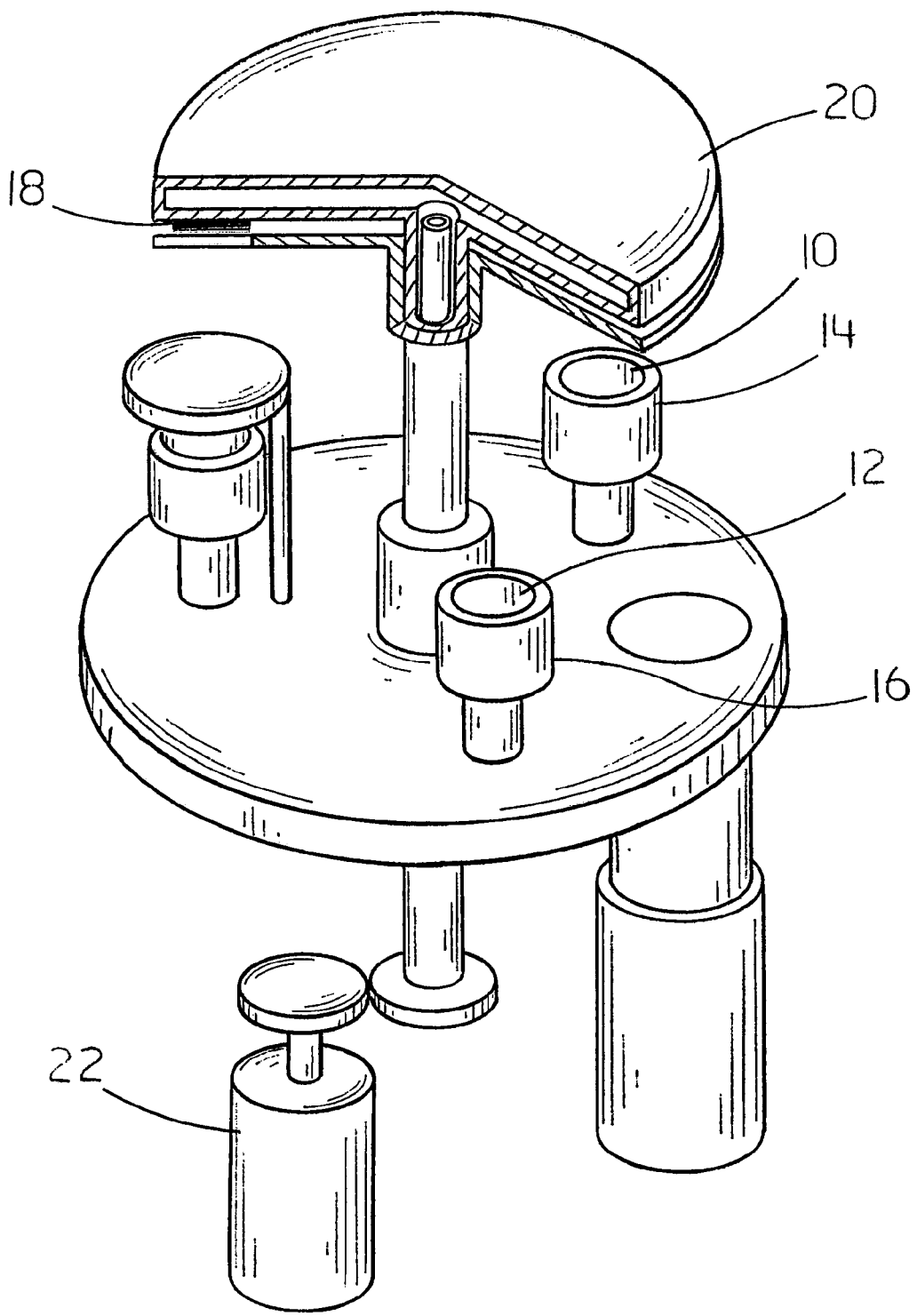
FIG. 1 is a diagrammatic representation of a sputtering apparatus of the type used to produce the present invention.

In a preferred embodiment of the invention, FePt multilayers are deposited on a substrate by RF and DC sputtering using a multiple-gun sputtering system (FIG. 1) with a microprocessor-controlled, water-cooled rotating substrate. While a system containing three guns is shown in FIG. 1, those skilled in the art will recognize that other configurations of the sputtering system including apparatus containing multiple guns and tables suitable for commercial production are possible. Preferably, the base pressure of the system is maintained at 2×10$^{-7}$ Torr while the Argon (Ar) pressure during the sputtering is maintained at 5×10$^{-3}$ Torr. Iron (Fe) and Platinum (Pt) targets (10 and 12), which consist of Iron and Platinum disks 2 inches in diameter and 0.1 to 0.2 inches in thickness, are inserted into the DC and RF sputtering guns (14 and 16), respectively. Substrates 18 are mounted on a rotating table 20 which is controlled by computer through a stepping motor 22. During sputtering, the table 20 is rotated alternately stopping the substrates 24 over the DC and RF sputtering guns (14 and 16). In this fashion, alternating layers of Iron and Platinum are deposited on the substrates. The thickness of each layer of the multilayer is controlled by adjusting the time that the substrate is stationary above the corresponding target. The as-deposited multilayers are then subjected to vacuum annealing. After annealing the FePt films have coercivities ($H_c$) in excess of 3000 Oe with extremely fine grain sizes.

Figure 2:
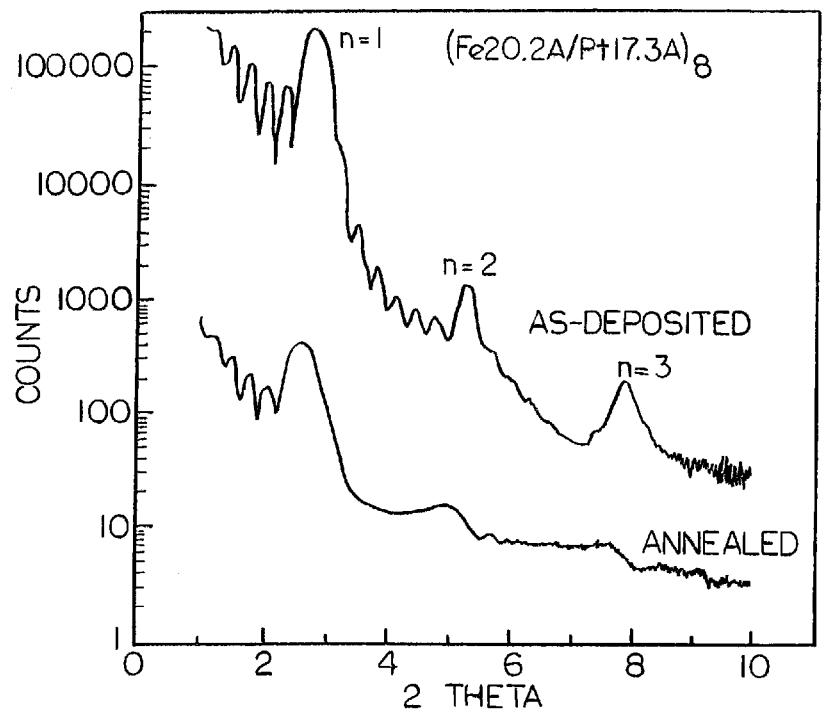
FIG. 2 is a chart depicting the small-angle x-ray diffraction of FePt film.

FIG. 2 shows the small-angle x-ray diffraction patterns of the as-deposited and the annealed FePt films. The first, second and third-order superlattice peaks may be observed in the x-ray diffraction scan of the as-deposited film. After annealing of the as-deposited sample in a vacuum at 300° C. for 15 minutes, the first order superlattice peak and traces of the second and the third order peaks may still be observed. Thus, the FePt film retains a layered structure after annealing.

Figure 3:
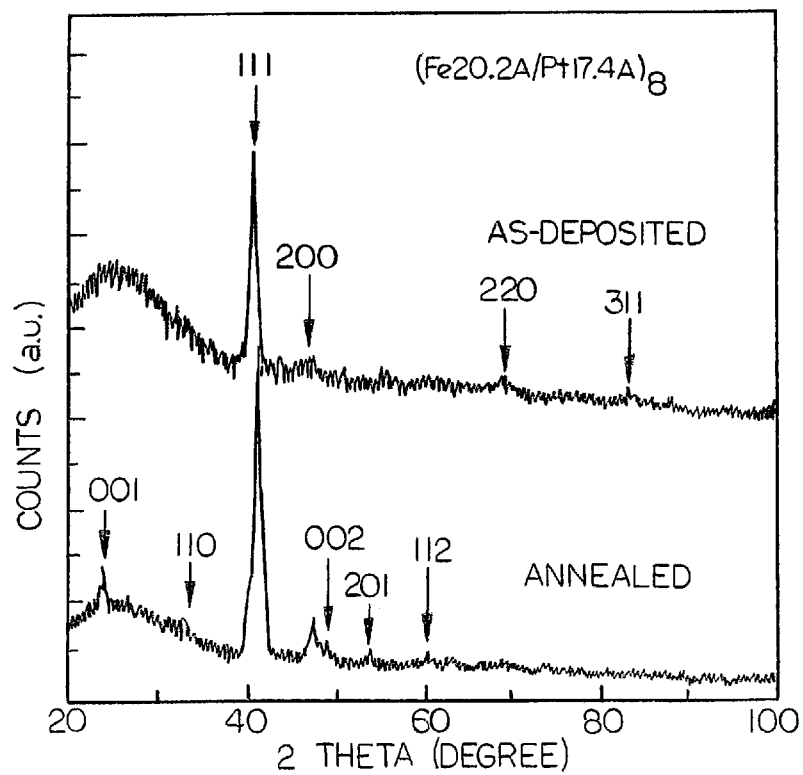
FIG. 3 is a chart depicting the large angle x-ray diffraction of FePt film.

The large-angle x-ray diffraction patterns of the as-deposited and annealed FePt films are shown in FIG. 3.

The as-deposited film has a disordered fcc structure (y-Phase). It grows along the [111] direction and a well defined (111) peak appears at 2θ=39.5°. After annealing at 300° C. for 15 minutes, the position of the (111) peak shifts slightly toward higher angle, and several new diffraction peaks, belonging to the fct phase (CuAuI structure), appear. The shift of the (111) peak is due to the smaller c-axis lattice parameter of the fct structure. The new peaks are indexed as (001), (110), (002), (201) and (112) respectively, as shown in FIG. 3.

Figure 4:
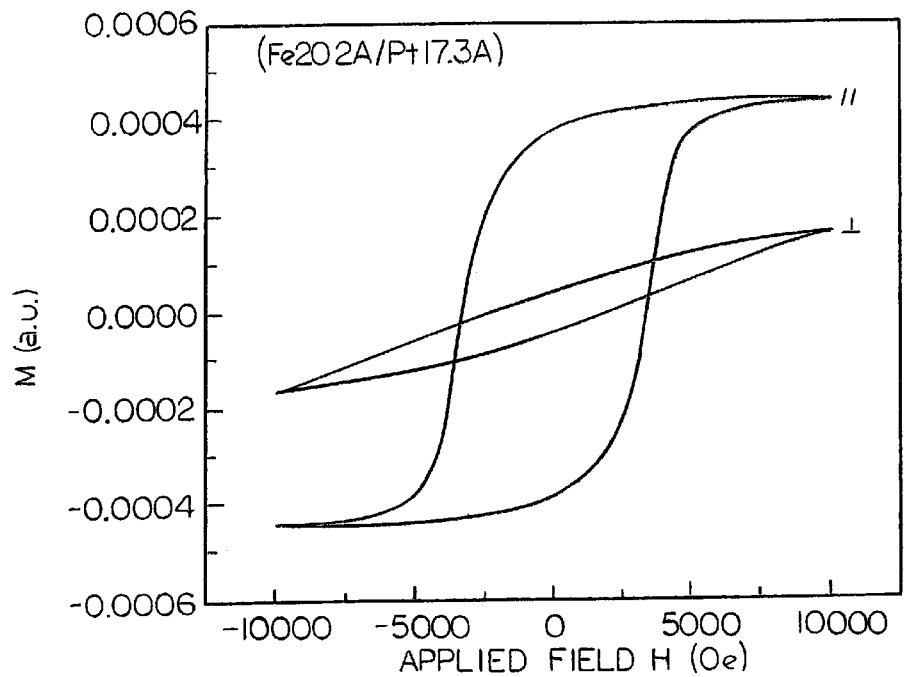
FIG. 4 is a chart illustrating the hysteresis loops of (Fe20.2 Å/Pt17.3 Å)$_8$ film annealed at 300° C. for 15 minutes.

The structural transformation from fcc to fct results in the significant change of the magnetic properties of the FePt film. According to the hysteresis loops of the as-deposited and annealed FePt films, the magnetic easy axis is found to lie in the film plane. The coercivities of the as-deposited films are small. After annealing, square loops and large coercivities were obtained. FIG. 4 shows the hysteresis loops of the 300° C. annealed FePt film with applied field both parallel and perpendicular to the film plane. An in-plane coercivity of 3200 Oe may be obtained. A minor loop is obtained along the perpendicular direction since the film was not saturated with the maximum 10,000 Oe applied field.

Figure 5:
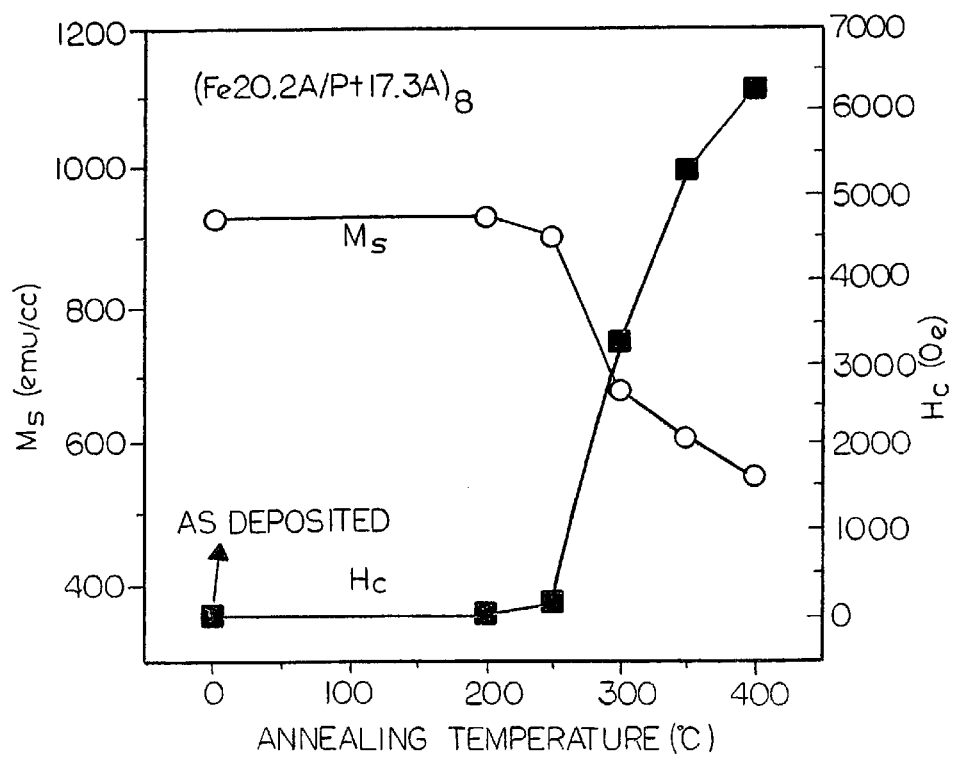
FIG. 5 is a chart showing the dependence of saturation magnetization ($M_s$) and coercivity ($H_c$) on the annealing temperature ($T_a$)

FIG. 5 illustrates the dependence of the in-plane coercivity ($H_c$) and saturation magnetization ($M_s$) of the (Fe20.2 Å/Pt17.3 Å)$_8$ multilayer on the annealing temperature ($T_a$). When the annealing temperature ($T_a$) is below 300° C., no significant changes of the in-plane coercivity ($H_c$) and the saturation magnetization ($M_s$) are observed. However, when the annealing temperature ($T_a$) is raised to 300° C. and above, $H_c$ increases sharply while $M_s$ decreases. These changes of $H_c$ and $M_s$ are caused by the fcc to fct structural transition. The decrease of the saturation magnetization ($M_s$) is due to the change of the ferromagnetic order of the fcc-structure to the ferromagnetic order of fct-structure which involves a decrease of the mean atomic magnetic moment ($\mu$). The structural transformation of the fcc phase (cubic) to the fct phase (tetragonal) results in a high crystal magnetic anisotropy energy of up to $7\times10^7$ erg/cm$^3$. This high anisotropy energy results in a large coercivity ($H_c$). If the annealing temperature is raised to 400° C., an $H_c$ as high as 7000 Oe may be observed. The transformation temperature of fcc to fct phase in the present FePt multilayers is approximately 300° C. Due to this low annealing temperature, small grain sizes of less than 15 nm may be obtained.

Figure 6:
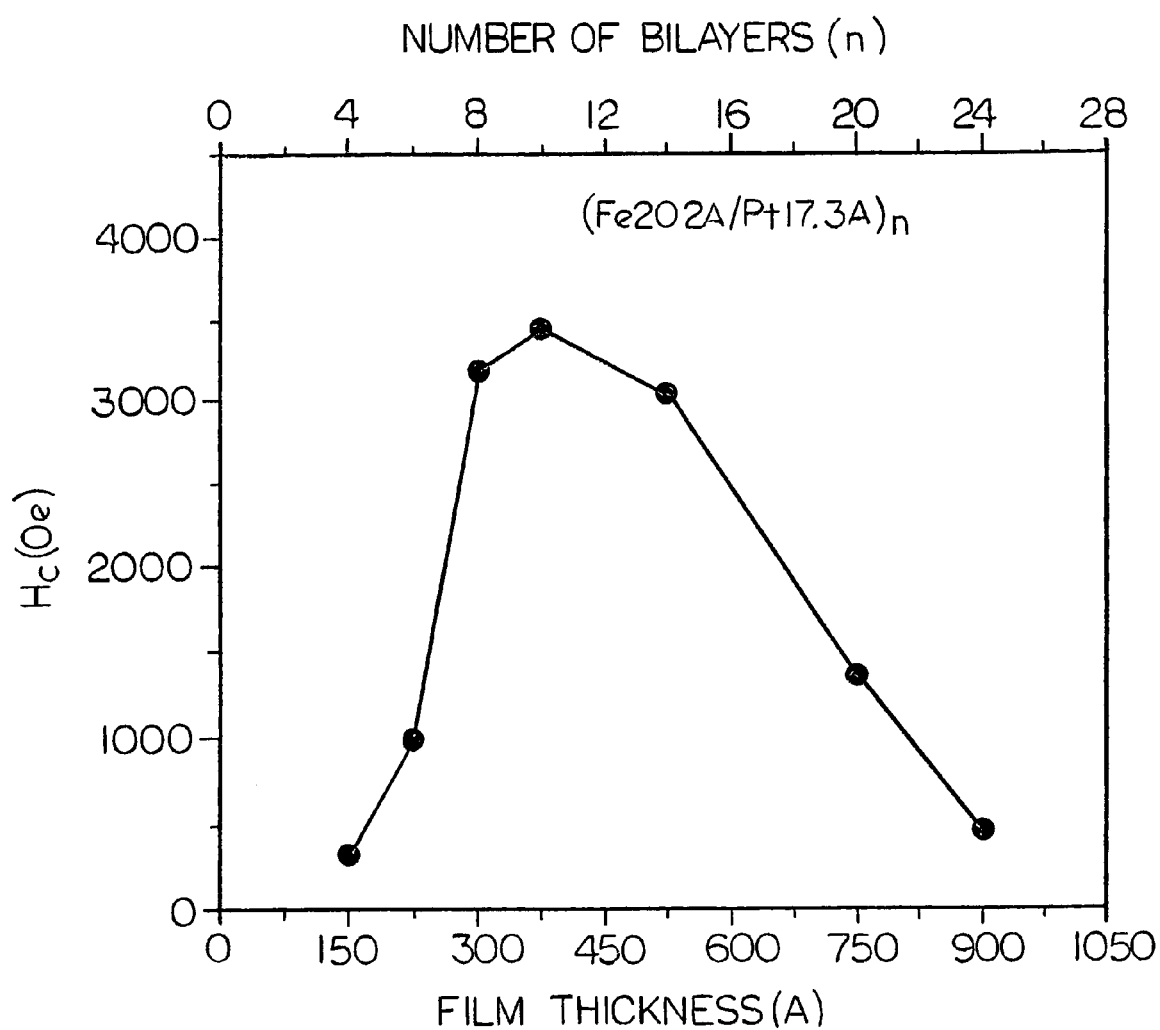
FIG. 6 is a chart illustrating the dependence of the coercivity ($H_c$) on the film thickness (t)
Figure 7:
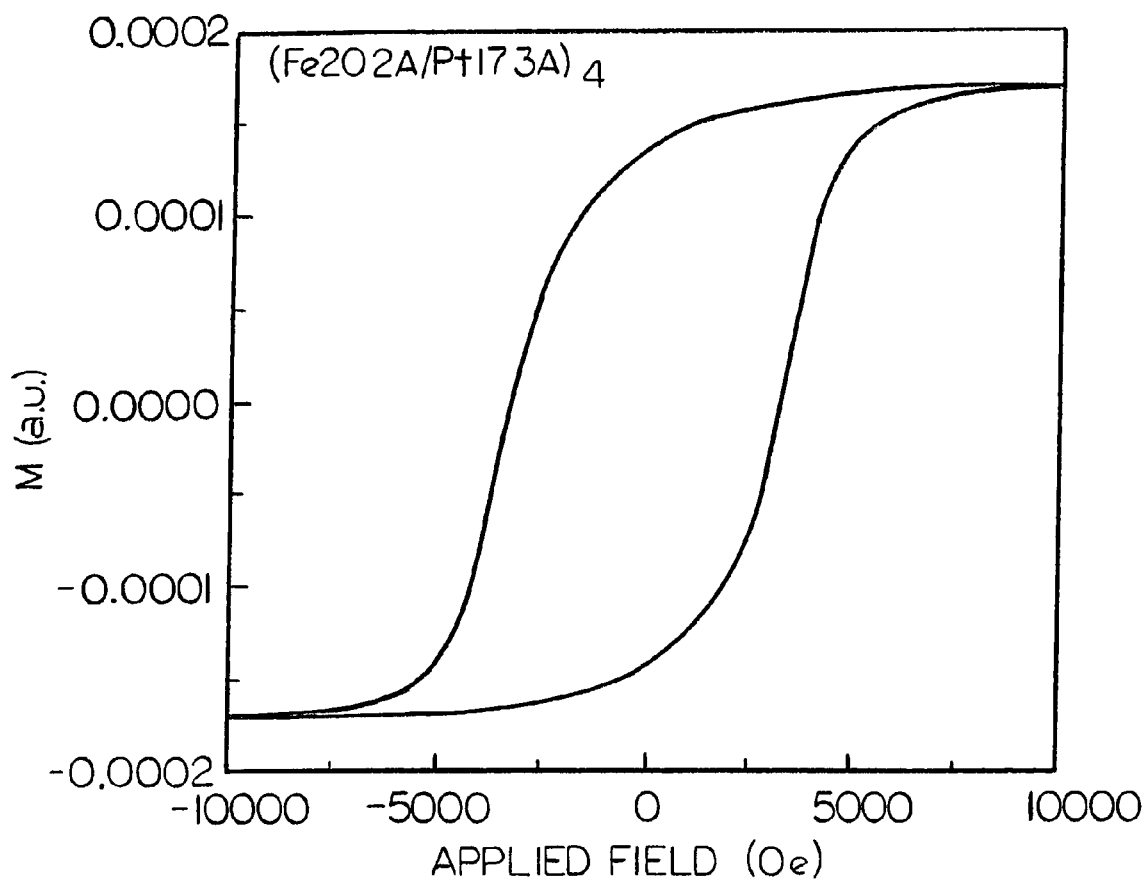
FIG. 7 is a chart illustrating the hysteresis loop of (Fe20.2 Å/Pt17.3 Å)$_4$ film annealed at 300° C. for 30 minutes.

The coercivity also depends on the film thickness. FIG. 6 shows (Fe20.2 Å/Pt17.3 Å)$_n$ multilayers of different thicknesses that were annealed at 300° C. for 15 minutes. Large coercivities are found among the films with thickness between 300 and 600 Å. When the film thickness (t) is greater than 600 Å, however, the coercivity ($H_c$) decreases sharply with any further increase in film thickness (t). When the film thickness (t) is smaller than 300 Å, the coercivity ($H_c$) is also small. For ultra-high density recording media, large coercivity is required. Under the annealing conditions described above, a film of 300 Å thickness is necessary to obtain the coercivity of 3000 Oe. However, the $M_r t$ of such 300° C. annealed film is approximately 1.8 memu/cm$^2$. Larger $H_c$ and smaller $M_r t$ values may be obtained by increasing annealing temperature and annealing time. FIG. 7 shows the hysteresis loop of a (Fe20.2 Å/Pt17.3 Å)$_4$ multilayer annealed at 300° C. for 30 minutes. By annealing the FePt film for 30 minutes, a large coercivity ($H_c$) of 3210 Oe may be obtained from a 150 Å thick film. In this fashion, a smaller $M_r t$ of 0.9 that is more suitable for high density magnetic recording may be obtained.

From the foregoing discussion, those skilled in the art will recognize that the coercivity of the FePt thin films may be adjusted by altering the annealing temperature, annealing time and film thickness. Other materials such as Cobalt (Co) or the like may be used in place of or in combination with Iron (Fe) and combined with Platinum (Pt) using the described sputtering and annealing process to obtain materials with properties suitable for use as ultra high density recording media.

What is claimed is:

1. A process for forming a longitudinal recording media suitable for ultra-high density magnetic recording, comprising the steps of:
    (a) alternately depositing thin film layers of the element Platinum (Pt) and elements of the group consisting of Iron (Fe) and Cobalt (Co) on a substrate to form multilayers of said elements; and
    (b) annealing said multilayers on said substrate.

2. The process of claim 1 wherein said elements are deposited on said substrate by RF- and DC-sputtering using a multiple gun sputtering system.

3. The process of claim 2 wherein the base pressure of the system is maintained at about $2\times10^{-7}$ Torr.

4. The process of claim 2 wherein the Argon (Ar) pressure of the system is maintained at about $5\times10^{-3}$ Torr.

5. The process of claim 1 wherein said multilayers are annealed at a temperature of 300° C. to 400° C.

6. The process of claim 5 wherein said multilayers are annealed for about 15 to 30 minutes.

7. The process of claim 1, wherein the longitudinal recording media has a coercivity ($H_c$) of 3000 Oe to 6300 Oe.

8. A process for forming a longitudinal recording media suitable for ultra-high density magnetic recording, comprising the steps of:
    (a) alternately depositing thin film layers of Platinum (Pt) and an element selected from the group consisting of Iron (Fe) and Cobalt (Co) on a substrate to form a magnetic recording layer; and
    (b) heat treating the substrate and magnetic recording layer.

9. The process of claim 8, wherein the longitudinal recording media has a coercivity ($H_c$) of 3000 Oe to 6300 Oe.

10. The process of claim 8, wherein said heat treating step comprises annealing the substrate and magnetic recording layer.

11. The process of claim 10, wherein annealing step comprises vacuum annealing the substrate and magnetic recording layer at a temperature of 300° C. to 600° C.

12. The process of claim 11, wherein the annealing step comprises vacuum annealing the substrate and magnetic recording layer from about 0 minutes to about 30 minutes.

13. The process of claim 11, wherein the annealing step comprises vacuum annealing the substrate and magnetic recording layer from about 0 minutes to about 15 minutes.

14. The process of claim 11, wherein the annealing step comprises vacuum annealing the substrate and magnetic recording layer from about 15 minutes to about 30 minutes.

15. The process of claim 8, wherein said depositing step comprises depositing the thin film layers by RF- and DC-sputtering.

16. The process of claim 15, wherein said depositing step further comprises maintaining the base pressure of the system at about $2\times10^7$ Torr.

17. The process of claim 15, wherein said depositing step further comprises maintaining the Argon (Ar) pressure of the system at about $5\times10^{-3}$ Torr.

18. A process for forming a longitudinal recording media having a coercivity ($H_c$) of 3000 Oe to 6300 Oe, comprising the steps of alternately depositing thin film layers of Platinum (Pt) and an element selected from the group consisting of Iron (Fe) and Cobalt (Co) on a substrate to form a magnetic recording layer.

19. The process of claim 18, further comprising the step of heat treating the substrate and magnetic recording layer.

20. The process of claim 19, wherein said heat treating step comprises annealing the substrate and magnetic recording layer.

21. The process of claim 20, wherein annealing step comprises vacuum annealing the substrate and magnetic recording layer at a temperature of 300° C. to 600° C.

22. The process of claim 18, wherein said depositing step comprises depositing the thin film layers by RF- and DC-sputtering.

23. A process for forming a longitudinal recording media suitable for ultra-high density magnetic recording, comprising the steps of:

(a) alternately depositing thin film layers of Platinum (Pt) and Iron (Fe) on a substrate to form a magnetic recording layer; and (b) heat treating the substrate and magnetic recording layer.

24. The process of claim 23, wherein the longitudinal recording media has a coercivity ($H_c$) of 3000 Oe to 6300 Oe.

25. The process of claim 23, wherein said heat treating step comprises annealing the substrate and magnetic recording layer.

26. The process of claim 25, wherein annealing step comprises vacuum annealing the substrate and magnetic recording layer at a temperature of 300° C. to 600° C.

27. The process of claim 26, wherein the annealing step comprises vacuum annealing the substrate and magnetic recording layer from about 0 minutes to about 30 minutes.

28. The process of claim 26, wherein the annealing step comprises vacuum annealing the substrate and magnetic recording layer from about 0 minutes to about 15 minutes.

29. The process of claim 26, wherein the annealing step comprises vacuum annealing the substrate and magnetic recording layer from about 15 minutes to about 30 minutes.

30. The process of claim 23, wherein said depositing step comprises depositing the thin film layers by RF- and DC-sputtering.

31. The process of claim 30, wherein said depositing step further comprises maintaining the base pressure of the system at about $2 \times 10^{-7}$ Torr.

32. The process of claim 30, wherein said depositing step further comprises maintaining the Argon (Ar) pressure of the system at about $5 \times 10^{-3}$ Torr.

* * * * *